United States Patent Office 3,144,443
Patented Aug. 11, 1964

3,144,443
5-TERTIARYAMINOALKYL-10-ALKOXY-5H-DIBENZ[b,f]AZEPINES
Walter Schindler, Riehen, near Basel, and Hans Blattner, Basel, Switzerland, assignors to Geigy Chemical Corporation, Ardsley, N.Y., a corporation of Delaware
No Drawing. Filed Sept. 11, 1962, Ser. No. 223,302
Claims priority, application Switzerland Nov. 16, 1959
8 Claims. (Cl. 260—239)

The instant invention concerns new N-heterocyclic compounds. It relates more particularly to new N-heterocyclic compounds of the formula

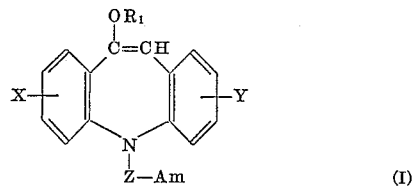

in which R signifies lower alkyl, X signifies hydrogen, chlorine, bromine, lower alkyl or lower alkoxy, Y signifies hydrogen, halogen or lower alkyl, Z signifies a straight or branched chain alkylene chain containing 2 to 6, preferably 2 to 4 carbon atoms, and Am signifies a lower dialkylamino group, while one of the two alkyl residues of Am may be combined with the alkylene residue Z, or both alkyl residues of Am may be combined among themselves, directly or via an oxygen atom, a lower alkylimino, lower hydroxyalkylimino or lower alkanolyloxyalkylimino group. In particular Am is di-(lower alkyl)-amino, 1-pyrrolidinyl, piperidino, morpholino, 4-methyl-1-piperazinyl, 4-(hydroxy-lower alkyl)-1-piperazinyl, e.g. 4-($\beta$-hydroxyethyl)-1-piperazinyl, 4-(lower alkanoyloxy-lower alkyl)-1-piperazinyl, e.g. 4-($\beta$-acetoxyethyl)-1-piperazinyl, or N-methyl-azacycloalkyl with 5 to 7 ring members, e.g. 1-methyl-2-piperidyl, 1-methyl-2-piperazinyl, and 1-methylhexahydro-azepinyl.

10-alkoxy-5-aminoalkyl-5H-dibenz[b,f]azepines of general Formula VI are useful biologically active compounds possessing antiallergic, reserpine-antagonistic and potentiating, effects the latter being evidenced when administered in combination with other medicinals, e.g. anaesthetics and analgesics. They can be administered perorally or parenterally, the latter preferably in the form of aqueous solutions of their non-toxic salts.

They are also useful as intermediates in the preparation of other medicinals, notably those of the 5H-dibenz[b,f]-azepin-10(11H)-one series.

Preferred compounds of Formula I having anti-allergic, reserpine-antagonistic and anti-inflammatory properties are those wherein —Z—Am represents the dialkylamino alkyl and polymethyleneimino alkyl moiety. They may be used in the treatment of allergic conditions such as asthma, hay fever and pruritis of allergic origin.

Preferred compounds of Formula I useful as potentiators, e.g. of anaesthetics and analgesics are those wherein —Z—Am represents the 4'-alkylpiperazinyl-(1')-alkyl moiety. The vegetative side effects caused are of only slight degree.

For the preparation of the new compounds, a 10-alkoxy-5H-dibenz[b,f]azepine of formula

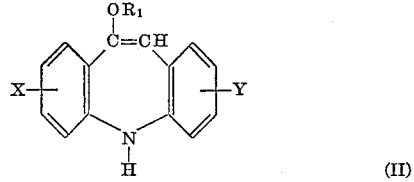

in which R₁, X and Y have the meanings given above, is reacted in the presence of a condensing agent with an aminoalkyl halide of formula

Hal—Z—Am      (III)

in which Hal signifies chlorine or bromine and Z and Am have the meanings given above.

Suitable condensing agents are, especially, sodamide, lithium amide, potassamide, sodium or potassium, butyl lithium, phenyl lithium or lithium hydride. The reaction may be carried out in the presence of an inert solvent, of which benzene, toluene and xylenes may be mentioned as examples.

Starting substances of the general Formula II are, for example, 10-methoxy-5H-dibenz[b,f]azepin, 10-ethoxy-5H-dibenz[b,f]azepine, 10-n-butoxy - 5H - dibenz[b,f]-azepine, 10-n-propoxy-, 10-isopropoxy-, 10-isobutoxy, 10-n-amyloxy- and 10-isoamyloxy-5H-dibenz[b,f]azepines, 10-methoxy-3,7-dichloro-5H-dibenz[b,f]azepine, 10-ethoxy-, 10-n-propoxy-, 10-isopropoxy-, and 10-n-butoxy-3,7-dichloro-5H-dibenz[b,f]azepines, and 10-methoxy- and 10-ethoxy-3-chloro-5H-dibenz[b,f]azepines. These compounds may be obtained starting from possibly substituted 5-lower alkanoyl-10,11-dihydro-5H-dibenz[b,f]azepines, by bromination in the 10-position with bromosuccinimide, elimination of hydrogen bromide, e.g. by heating with tertiary organic bases such as collidine or treatment with alcoholic caustic potash in the cold, addition of bromine to the 5-lower alkanoyl-5H-dibenz[b,f]azepine formed, treatment of the 10,11-dibromo compounds with alcoholic caustic potash and reaction of the 5-lower alkanoyl-10-bromo-5H-dibenz[b,f]azepines obtained with alkali metal lower alkanolates whereby bromine is replaced by lower alkoxy and the 5-acyl group is split off at the same time.

As examples of suitable aminoalkyl halides of Formula III may be mentioned: dimethylamino-ethyl chloride, diethylamino-ethyl chloride, methylethylamino-ethyl chloride, $\beta$-dimethyl aminopropyl chloride, $\beta$-dimethylamino-isopropyl chloride, $\gamma$-dimethylamino-propyl chloride, $\gamma$-dimethylamino-butyl chloride, $\gamma$-dimethylamino-$\beta$-methyl-propyl chloride, $\beta$-(di-n-propylamino)-ethyl chloride, $\beta$-(methyl-isopropylamino)-ethyl chloride, $\beta$-(di-n-butylamino)-ethyl chloride, $\beta$-(di-isobutylamino)-ethyl chloride, pyrrolidinyl-(1)-ethyl chloride, piperidino-ethyl chloride, $\gamma$-piperidino-propyl chloride, $\beta$-morpholino-ethyl chloride, $\beta$-(4-methyl-piperazinyl-(1')-ethyl chloride and 1-methyl-piperidyl-(3)-methyl chloride, as well as the corresponding bromides.

A second process for the preparation of the compounds of Formula I consists in reacting a compound of formula

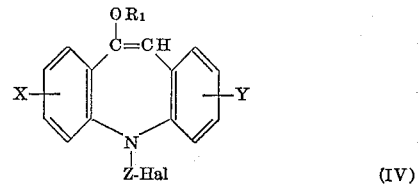

in which R₁, X, Y, Z and hal have the meanings given above, with a secondary amine of formula

Am—H      (V)

Am having the meaning given above, but of course no linkage between an alkyl residue of Am and Z can be present. The reaction is carried out, for example, at a moderately high temperature of, for example, 80–120°, in an inert solvent such as a low molecular weight alkanol or alkanone, when an excess of the amine to be reacted is suitably used as an acid binding agent. The reaction may in some cases be carried out in a closed vessel, depending on the boiling point of the amine used and of the solvent, as well as the reaction temperature necessary. Compounds of formula IV are obtained, for example, by reacting alkali metal compounds of 10-alkoxy-5H-dibenz[b,f]azepines of the general formula II with nongeminal dihaloalkanes, especially those with two different halogen atoms such as lower α-chloro-ω-bromoalkanes. The compounds of Formula IV are reacted, for example, with dimethylamine, methylethylamine, diethylamine, di-n-butylamine, pyrrolidine, piperidine, morpholine, 4 - methyl-piperazine, 4 - hydroxyethyl-piperazine, 4 - (γ-hydroxypropyl)-piperazine or 4--acetoxyethyl-piperazine.

By adding on to the tertiary amines of the general Formula II reactive esters, especially halides or sulphates, of aliphatic or araliphatic alcohols, for example, methyl iodide, dimethyl sulphate, ethyl bromide, ethyl iodide or benzyl chloride, monoquaternary ammonium compounds are formed in the usual way, in which case the group Am reacts.

With inorganic or organic acids, such as hydrochloric acid, hydrobromic acid, sulphuric acid, phosphoric acid, methanesulphonic acid, ethanedisulphonic acid, acetic acid, citric acid, malic acid, succinic acid, fumaric acid, maleic acid, tartaric acid, benzoic acid and phthalic acid, the tertiary bases form salts, some of which are water soluble.

The following example illustrates in more detail the preparation of the new compounds. Parts therein are parts by weight and these are to parts by volume as grams are to cubic centimeters. The temperatures are given in degrees centigrade.

*Example 4*

12 parts of 10-ethoxy-5H-dibenz[b,f]azepine are dissolved in 50 parts by volume of absolute benzene and the benzene solution of the base consisting of 9 parts of γ-dimethylaminopropyl chloride hydrochloride is added. 2.2 parts of sodamide suspended in toluene are allowed to drop in at 50–60° with stirring, and the reaction mixture is then boiled under reflux for 20 hours. After cooling, it is decomposed with water, the benzene layer is separated and extracted five times with dilute acetic acid. The acid extracts are made alkaline and extracted with ether, the ethereal solution is washed with water, dried over sodium sulphate and evaporated. The oily residue is distilled at high vacuum, when 5-(γ-dimethylamino-propyl) - 10-ethoxy-5H-dibenz[b,f]azepine passes over at 160–161° under 0.001 mm pressure.

The hydrochloride, prepared in ether with absolute alcoholic hydrochloric acid, melts at 166–169°.

In a similar way the following compounds, for example, may be prepared:

5-(β-dimethylamino-ethyl-10-methoxy-5H-dibenz[b,f] azepine, M.P. 90°,
5-(γ-piperidino-propyl)-10-methoxy-5H-dibenz[b,f] azepine, B. P. $_{0.01}$ 191–193°,
5-[β-pyrrolidinyl-(1′)-ethyl]-10-ethoxy-5H-dibenz[b,f] azepine B.P.$_{0.001}$ 162°,
5-(γ-dimethylamino-propyl)-10-methoxy-3,7-dichloro-5H-dibenz[b,f]azepine, M.P. 96°,
5-(γ-dimethylamino-propyl)-10-n-butoxy-5H-dibenz [b,f]azepine, B.P. $_{0.003}$ 173°,
5-γ-dimethylamino-propyl)-10-methoxy-5H-dibenz [b,f]azepine, B.P.$_{0.001}$ 170°,
5-[γ-4′methyl-piperazinyl-1′)-propyl]-10-methoxy-5H-dibenz[b,f]azepine, B.P.$_{0.03}$ 195°,
2-methoxy-5-(γ-dimethylamino-propyl)-10-methoxy-5H-dibenz[b,f]azepine,
5-(γ-dimethylamino-propyl)-10-methoxy-3,7-dimethyl-5H-dibenz[b,f]azepine.
5-(γ-dimethylaminopropyl)-10-methoxy-3,7-dichloro-5H-dibenz[b,f]azepine.

The above mentioned alkali metal compounds of the compounds of Formula II are obtained by conventional methods.

This application is a continuation-in-part of our co-pending patent application S.N. 69,302 and 156,553, filed on November 15, 1960, and November 8, 1961, respectively, and both now abandoned.

We claim:
1. A compound selected from the group consisting of an N-heterocyclic compound of the formula

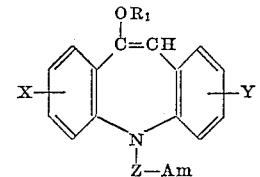

(VI)

wherein $R_1$ is lower alkyl,
X is a member selected from the group consisting of hydrogen, chlorine, bromine, lower alkyl and lower alkoxy,
Y is a member selected from the group consisting of hydrogen, chlorine, bromine and lower alkyl,
Z is an alkylene chain containing 2 to 6 carbon atoms, and
Am is a member selected from the group consisting of di - (lower alkyl)amino, 1 - pyrrolidinyl, piperidino, morpholino, 4-methyl-1-piperazinyl, 4-(β-hydroxyethyl)-1-piperazinyl, 4-(β-acetoxyethyl)-1-piperazinyl N-methyl - pyrrolidyl, N - methyl-piperidyl and N-methylhexahydroazepinyl,
and the non-toxic salt thereof with a compatible acid.
2. 5 - (γ-dimethylamino-propyl)-10-ethoxy-5H-dibenz-[b,f]azepine.
3. 5 - (β-dimethylamino-ethyl)-10-methoxy-5H-dibenz-[b,f]azepine.
4. 5 - (γ-piperidino-propyl) - 10 - methoxy-5H-dibenz [b,f]azepine.
5. 5 - [β-pyrrolidinyl-(1′)-ethyl]-10-ethoxy-5H-dibenz-[b,f]azepine.
6. 5 - (γ - dimethylamino-propyl)-10-n-butoxy-5H-dibenz[b,f]azepine.
7. 5-(γ-dimethylamino-propyl)-10-methoxy-5H-dibenz-[b,f]azepine.
8. 5 -[γ-(4′-methyl-piperazinyl-1′-propyl]-10-methoxy-5H-dibenz[b.f]azepine.

No references cited.